United States Patent Office 2,920,067
Patented Jan. 5, 1960

2,920,067

POLYMERIZATION OF ETHYLENE

George A. Mortimer, La Marque, Tex., assignor to Monsanto Chemical Company, St. Louis, Mo., a corporation of Delaware No Drawing. Application August 11, 1958
Serial No. 754,155

9 Claims. (Cl. 260—94.9)

This invention relates to a process for the polymerization of ethylene. More particularly, it relates to a new class of initiators for the preparation of polyethylenes.

It is well known that ethylene can be polymerized with the aid of catalysts or materials which supply free radicals which serve as initiators of polymerization. A new class of initiators for ethylene polymerization has now been discovered which have certain advantages over those presently known in the art. According to the invention, ethylene is polymerized at elevated temperatures and pressures employing as an initiator an alkyl nitrate having from 1 to 8 carbon atoms. The alkyl nitrates decompose at higher temperatures than do many of the initiators of the prior art. It is theorized, but such theory is not to be construed as limiting the invention in any manner whatsoever, that upon decomposition under conditions for polymerization of ethylene, the alkyl nitrates furnish free radicals which promote polymerization while at the same time they yield radicals which effectively inhibit polymerization. They contain in other words "built-in" controls for the free radicals liberated. This provides a polymerization system in which conversion is relatively independent of initiator concentration and wherein molecular weight of the polymer can be more effectively controlled by means of initiator concentration. For example, at given conditions of temperature and pressure, a higher concentration of initiators of the invention can be employed to obtain a wax-like polyethylene with specific desirable properties without running the risk of a "runaway" reaction which is the expected effect when the initiators of the prior art are used at the same concentration levels for the same purpose.

The following examples are given to illustrate the invention but are not to be construed as limiting its scope in any manner. All parts are by weight. The specific viscosities reported were determined on 0.1% solutions of the polymer in xylene at 105° C.

Example 1

Monomeric ethylene containing substantially no oxygen was charged into a steel bomb containing ethyl nitrate as a polymerization initiator dissolved in benzene. Approximately 374 parts of ethyl nitrate (in 2.0 ml. of benzene) were used per million parts of ethylene and mixing was effected by jet action of the entering ethylene. The bomb was heated to a temperature of 175° C. under a pressure of 9750 p.s.i.g. for about 65 minutes. The pressure was then released and the reaction product removed. About 1.3 g. of a waxy solid polyethylene was obtained which had a density of 0.928 and a specific viscosity of 0.075.

Example 2

Following the procedure of Example 1, ethylene was polymerized in the presence of 1495 p.p.m. of ethyl nitrate at 175° C. and 9500 p.s.i. pressure over a period of 88 minutes. Polymer of a character comparable to that of Example 1 having a density of 0.935 and a specific viscosity of 0.051 was obtained in a once-through yield of 6.6%.

Example 3

Ethylene was polymerized in the same reactor and using the same method of Example 1 at a temperature of 174° C., a pressure of 10,000 p.s.i.g., and in the presence of 7200 p.p.m. of ethyl nitrate dissolved in 2.0 ml. of benzene. The polyethylene wax obtained was similar to that produced in Example 2. Conversion in this instance was 6.9% and the specific viscosity of the polyethylene was 0.032.

Example 4

A number of runs were made in which ethylene was polymerized using ethyl nitrate as an initiator in the manner of Example 1 but under various conditions of temperature, pressure and initiator concentration. Results are tabulated below. The polyethylene revovered in every run was an essentially white, tough, high-melting solid.

| Run No. | Temp. (° C.) | Press. (p.s.i.g.) | Initiator Conc. (p.p.m.) | Reaction Time (min.) | Conv. (percent) | Density of Product | Specific Viscosity |
|---|---|---|---|---|---|---|---|
| 100 | 175 | 20,000 | 68 | 59 | 8.9 | 0.922 | 0.313 |
| 118 | 174 | 25,000 | 27 | 51 | 2.0 | 0.925 | 0.429 |
| 125 | 171–177 | 30,000 | 19 | 17 | 4.5 | 0.927 | 0.600 |
| 133 | 173 | 35,000 | 20 | 61 | 6.5 | 0.925 | 0.453 |

Example 5

Monomeric ethylene containing substantially no oxygen and a 1% solution of isoamyl nitrate in n-hexane is continuously charged to a jacketed stainless steel tubular reactor wherein the pressure is maintained at 20,000 p.s.i.g. and which is heated to a jacket temperature of 230°–250° C. Rates of charging are such that the concentration of the isoamyl nitrate initiator in the reactor is about 400 parts per million parts of ethylene present and dwell time in the reactor is approximately 45 seconds. Molten polymer is continuously removed from the reactor by means of a suitable let-down valve. A good yield of a white solid polyethylene is obtained. This polyethylene can be easily molded and extruded by conventional means such as injection molding compression molding or screw extrusion.

Example 6

A stirred pressure reactor is charged with n-octyl nitrate. Oxygen-free ethylene is then introduced into the reactor up to a pressure of 7500 p.s.i.g. and the reactor is heated to a temperature of about 160° C. Upon reaching this temperature, the ethylene pressure is raised to 12,000 p.s.i.g. and polymerization is continued with constant agitation for about four hours. The concentration of initiator at the higher pressure represents about 0.1% by weight of the total ethylene charged. At the end of the reaction period, the pressure is released and a good yield of solid polyethylene is obtained.

Other initiators and reaction conditions than those exemplified may be used without departing from the scope of the invention. Any alkyl nitrate containing 1 to 8 carbon atoms may be used to initiate the polymerization reaction. In addition to those mentioned, methyl nitrate, n-propyl nitrate, n-isopropyl nitrate, n-butyl nitrate, isobutyl nitrate, n-amyl nitrate, n-hexyl nitrate, isooctyl nitrate and the like are all equally suitable. Mixtures of these compounds can also be used as can mixtures of the alkyl nitrates with other free-radical initiators commonly employed in the art.

Temperatures may vary from 150° C. to about 400° C. The polymerization process may be conducted on either a batch or continuous basis as the examples illustrate. In batch operation, the preferred temperatures lie in the range from about 150° C. to 200° C. whereas in a continuous process the preferred temperature range is from 165°–300° C.

Pressure may likewise vary over a wide range from 2500 p.s.i.g. to 50,000 p.s.i.g. and above depending upon the particular type of polymer desired.

The amount of initiator used depends to some extent upon the type of polymer desired. One of the advantages of the initiators of the invention is that they provide a polymerization process in which the molecular weight of the polymer at a given temperature and pressure may be varied over a wide range of varying the concentration of catalyst while still retaining good control over the reaction. Thus, amounts of initiator from as little as 0.0001% to as much as 1.5% by weight of the ethylene to be polymerized may be used. A waxy polymer may be obtained by using the higher concentrations of initiator at low pressures, or a tough solid polymer may be produced at high pressures by using an amount of initiator in the low end of the range.

The initiators may be introduced into the reactor as such or in a carrier liquid or solvent. They are soluble in most aliphatic nad aromatic hydrocarbons and in other common organic solvents such as ethers, alcohols, etc. and so may be introduced by means of solutions in these liquids.

Not only homopolymers may be prepared using the alkyl nitrates as initiators. Ethylene may be copolymerized as well with other polymerizable compounds using these initiators. Suitable comonomers include, for example, vinyl halides such as vinyl fluoride, vinyl chloride, etc.; vinyl hydrocarbons, both aliphatic and aromatic, such as propylene, isobutylene, and other olefins, butadiene, isoprene, piperylene, dimethylbutadiene, styrene, alphaalkyl styrenes, ring-substituted alkyl styrenes and the like; the halogen derivatives of hydrocarbons such as chlorostyrenes, fluorostyrenes, chloroprene, bromoprene; vinylidene compounds such as vinylidene chloride, vinylidene fluoride, 1,1-chlorofluoroethylene; vinyl esters including vinyl acetate, vinyl butyrate, vinyl stearate, etc.; vinyl ethers including vinyl methyl ether, vinyl ethyl ether, vinyl octyl ether, and the like; acrylic acid. acrylonitrile, acrylic esters including methyl, ethyl, propyl, phenyl, etc., acrylates, acrylamide, $\alpha$-substituted acrylic acids, nitriles, esters, and amides such as methacrylic acid, methacrylonitrile, ethyl methacrylate, methylacrylamide, methyl methacrylate, atroponitrile, etc.; the acids, esters, and amides of $\alpha,\beta$-ethylenically unsaturated dicarboxylic acids such as fumaric, maleic, citraconic, itaconic, etc., acids or anhydrides, their esters and amides and the like. If a copolymer is prepared by the process of this invention, it should contain more than 50% by weight of ethylene.

What is claimed is:

1. The process of polymerizing ethylene which comprises heating ethylene to a temperature of at least 150° C. at a pressure in excess of 2500 p.s.i.g. in the presence of an alkyl nitrate containing from 1 to 8 carbon atoms in an amount sufficient to initiate the polymerization.

2. The process of polymerizing ethylene which comprises heating ethylene to a temperature from about 150° C. to about 400° C. at a pressure in the range from 2500 to 50,000 p.s.i.g. in the presence of from about 0.0001% to about 1.5% by weight of the ethylene to be polymerized of an alkyl nitrate containing from 1 to 8 carbon atoms.

3. The process of claim 2 wherein the alkyl nitrate is ethyl nitrate.

4. The process of claim 2 wherein the alkyl nitrate is isoamyl nitrate.

5. The process of claim 2 wherein the alkyl nitrate is n-octyl nitrate.

6. The process of polymerizing ethylene which comprises heating ethylene to a temperature from about 150° C. to about 200° C. at a pressure in the range from about 20,000 to about 25,000 p.s.i.g. in the presence of from about 0.0001% to about 1.5% by weight of the ethylene to be polymerized of an alkyl nitrate containing from 1 to 8 carbon atoms.

7. The process of claim 3 wherein the alkyl nitrate is ethyl nitrate.

8. The process of claim 3 wherein the alkyl nitrate is isoamyl nitrate.

9. The process of claim 3 wherein the alkyl nitrate is n-octyl nitrate.

References Cited in the file of this patent
UNITED STATES PATENTS

| | | |
|---|---|---|
| 2,462,678 | Roedel | Feb. 22, 1949 |
| 2,478,066 | Van Peski | Aug. 2, 1949 |

OTHER REFERENCES

"Catalysis—Inorganic and Organic" (Berkman et al.), published by Reinhold (New York), 1940 (pages 177 and 335 referred to).